June 10, 1952     O. H. SCHMITT     2,599,945
VOLTAGE STABILIZER
Filed Jan. 15, 1946

INVENTOR.
Otto H. Schmitt
BY M. O. Hayes

ATTORNEY

Patented June 10, 1952

2,599,945

UNITED STATES PATENT OFFICE 2,599,945

VOLTAGE STABILIZER

Otto H. Schmitt, Mineola, N. Y., assignor to the United States of America as represented by the Secretary of the Navy Application January 15, 1946, Serial No. 641,337

6 Claims. (Cl. 250—36)

This invention relates to voltage stabilizers.

An object is to provide an improved voltage stabilizer for high-frequency alternating-current generators, and in particular for high-frequency oscillators.

It is common experience that the output voltage of an oscillator changes when any of its many operating conditions are changed. It is frequently highly desirable that some means be provided for stabilizing the output voltage. Particularly in frequency-modulated oscillators, in variable loaded amplitude-modulated oscillators, and in oscillators with varying direct-current supply voltage, the need for such regulation arises. According to this invention, a neon tube or other gas-filled voltage regulator is connected as a load on the resonant circuit so as to decrease the Q thereof should there be any tendency toward increased voltage developed between two points of that resonant circuit. In an oscillator the resonant circuit of which is of transmission-line design, the transmission line may take the form of a sealed coaxial line that is gas filled. In this instance the voltage regulator does not form a discrete component.

Figure 1:
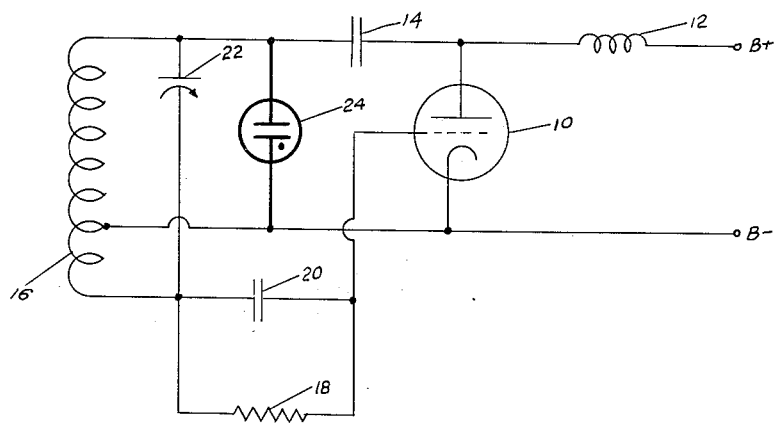
Figure 2:
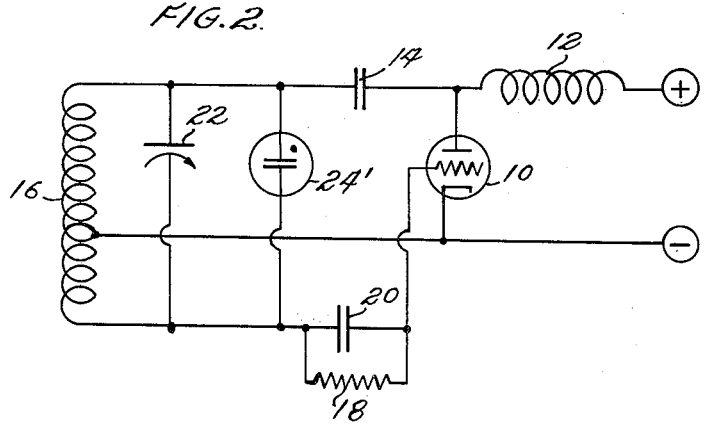

For a better understanding of the invention, reference is made to the drawing in which Fig. 1 is a schematic wiring diagram of the voltage stabilizer of the present invention, and Fig. 2 is a schematic wiring diagram of a modification thereof.

The drawing illustrates the invention as applied to an ordinary Hartley oscillator. It should be understood that it is equally effective in other types of feedback oscillators and to oscillators generally, and is effective to a limited extent when applied to the amplifier stages of multiple-stage voltage generators. Furthermore, it is not restricted to use with generators having vacuum tube amplifiers, but may be used with other types of amplifiers.

The Hartley oscillator in the drawing comprises triode 10 the plate of which is energized from a direct-current power supply (which may if desired be a voltage-regulated supply) through radio-frequency choke 12 and is coupled to the plate end of resonant circuit 16, 22 through blocking capacitor 14. The cathode of triode 10 is connected to a tap in coil 16 of the resonant circuit and to the negative terminal of the direct current supply. The usual grid-bias resistor 18, and coupling capacitor 20 are connected in parallel, between the grid of triode 10 and the grid end of coil 16 in a conventional manner. Tuning capacitor 22 is connected across coil 16 and completes the resonant circuit.

The frequency at which the oscillator operates can, to some extent, be dependent upon the load and can be made to vary by mechanical tuning and by means of a coupled or connected reactance tube. A variation in the output voltage is to be expected with changes in frequency. The output voltage can also be unintentionally varied by changes in load, in direct-current supply voltage and by various other determining factors. Particularly in lightly loaded, frequency-modulated oscillators, it has been found highly effective, for output voltage stabilization, to load the parallel tuned circuit 16, 22 with a neon tube 24. In the drawing, this tube is shown as spanning only a part of coil 16, but it may be connected to span the entire coil 16, as shown in Fig. 2, or it may be connected to a secondary winding tightly coupled to coil 16. When connected to span the entire coil, remarkably stable output voltage has been obtained and is to be expected with the other connections. It is necessary to select a neon or like tube of such gas pressure that it breaks down in normal operation, thus loading the resonant circuit. It is believed that the stabilization is due to a disproportionate decrease in the Q of the resonant circuit caused by regulator 24 for slight increases in voltage developed across the tuned circuit. It has been found that the device functions without introducing appreciable harmonic distortion above the highest frequency at which the gas, when ionized, is restored to its deionized state; that is above approximately 10-15 kilocycles per second, depending on the gas used. A neon tube stabilized an FM oscillator well at 5.5 megacycles per second.

The invention described above is to be distinguished from the use of gas-type lightning arrestors, and protective devices generally, designed to break down only on severe voltage excesses and therefore not significantly loading, the input circuits of radio receivers and like applications during normal operation. The range of utility of the invention as defined in the following claims as well as the equivalents that can be substituted will be clear to those skilled in the art.

What is claimed is:

1. In combination, a vacuum tube provided with anode, cathode and grid elements, oscillatory circuit means including an inductance coil connected at one end to said anode and at the other end to said grid, means connecting a point intermediate the ends of said inductance coil to said cathode, to form an oscillation generating system, and a gas-filled tube shunted across a portion of said inductance coil and adapted automatically to stabilize the output voltage.

2. The combination as in claim 1 wherein said gas-filled tube is connected directly to the anode-connected end of said coil and to said intermediate point on said coil.

3. Apparatus of the character described comprising an electron discharge tube having plate, cathode and grid electrodes and a parallel resonant circuit connected to said plate, grid and cathode electrodes, means providing a potential difference between said cathode, plate and grid electrodes whereby continuous electrical oscillations are set up and maintained in said resonant circuit, and amplitude-control means for limiting the amplitude of said oscillations including a glow discharge tube and low-resistance conductive means connecting said glow discharge tube across said parallel resonant circuit.

4. Amplitude stabilization apparatus comprising an electron discharge tube, resonant circuit means connected to said tube and adapted upon energization thereof to generate and maintain electrical oscillations at predetermined amplitude values, said resonant circuit means normally having a selected figure of merit, and means connected to said resonant circuit and responsive to rise of amplitude of said oscillations above said predetermined level to cause a disproportionate decrease in the figure of merit of said circuit, thereby to effect stabilization of said amplitude of oscillations.

5. Amplitude stabilization apparatus, comprising an electron discharge tube, resonant circuit means connected to said tube and adapted upon energization thereof to generate and maintain electrical oscillations at predetermined amplitude values, said resonant circuit means normally having a selected figure of merit, a glow-discharge tube, and low-resistance conductive means connecting said glow-discharge tube across said resonant circuit means, said glow-discharge tube being responsive to rise of amplitude of said oscillations above said predetermined level to cause a disproportionate decrease in the figure of merit of said circuit, thereby to effect stabilization of said amplitude of said oscillations.

6. Amplitude stabilization apparatus, comprising an electron discharge tube, resonant circuit means connected to said tube and adapted upon energization thereof to generate and maintain electrical oscillations at predetermined amplitude values, said resonant circuit means normally having a select figure of merit, and a glow discharge tube conductively connected across said resonant circuit means and responsive to variations of amplitude of said oscillations from said predetermined level to cause disproportionate variations in the figure of merit of said circuit.

OTTO H. SCHMITT.

REFERENCES CITED

The following references are of record in the file of this patent:

UNITED STATES PATENTS

| Number | Name | Date |
|---|---|---|
| 1,930,278 | Morrison | Oct. 10, 1933 |
| 2,139,023 | Kock | Dec. 6, 1938 |
| 2,257,663 | Albrecht | Sept. 30, 1941 |
| 2,352,219 | Olesen | June 27, 1944 |
| 2,424,905 | Scheldorf | July 29, 1947 |
| 2,452,559 | Fremlin | Nov. 2, 1948 |